United States Patent [19]

Watanabe et al.

[11] 4,002,587
[45] Jan. 11, 1977

[54] PROCESS FOR PRODUCING GRANULAR ACTIVATED CARBON

[75] Inventors: Yasuo Watanabe, Sanjo; Toshiyuki Miyajima, Tokyo, both of Japan

[73] Assignee: Bridgestone Tire Co., Ltd., Tokyo, Japan

[22] Filed: May 30, 1975

[21] Appl. No.: 582,244

[30] Foreign Application Priority Data

Feb. 7, 1975   Japan .............................. 50-15282

[52] U.S. Cl. .............................. 264/29.4; 252/421; 264/29.5; 264/105; 264/141; 264/148; 264/DIG. 69; 423/449

[51] Int. Cl.² ...................................... C01B 31/08

[58] Field of Search ............ 264/29, 140, 141–143, 264/105, 148, DIG. 69, 29.4, 29.5; 252/421; 423/449; 425/144, 378 R

[56] References Cited

UNITED STATES PATENTS

| 2,008,145 | 7/1935 | Morrell ............................. 252/421 |
| 2,455,509 | 12/1948 | Luaces ............................. 264/141 |
| 2,566,105 | 8/1951 | Zert ................................. 264/29 |
| 2,799,053 | 7/1957 | Gartland .......................... 264/105 |
| 3,254,143 | 5/1966 | Heitman ........................... 264/105 |
| 3,822,218 | 7/1974 | Whittaker et al. ................. 252/421 |
| 3,823,224 | 7/1974 | Laman et al. ...................... 252/421 |
| 3,875,077 | 4/1975 | Sanga ............................... 252/421 |

OTHER PUBLICATIONS

Binders and Base Materials for Active Carbon — Morgan et al., *Industrial and Engineering Chemistry,* vol. 38, No. 2, Feb. 1946, pp. 219–228.

*Primary Examiner*—Jeffery R. Thurlow
*Attorney, Agent, or Firm*—Brooks Haidt Haffner & Delahunty

[57] ABSTRACT

Granular activated carbon is produced from a waste tire pyrolysis residue by kneading homogeneously the residue, a wooden carbonaceous material, and a carbonaceous binder under heat, extruding the resulting mixture by an extruder under certain heating conditions, and carbonizing and activating the extruded material.

8 Claims, 1 Drawing Figure

PROCESS FOR PRODUCING GRANULAR ACTIVATED CARBON

BACKGROUND OF THE INVENTION

1. Field of the Invention

The present invention relates to a process for producing granular activated carbon of high quality from waste tire pyrolysis residues.

2. Description of the Prior Art

The granular activated carbon has been hitherto produced by compounding carbonaceous materials such as coal with binder, shaping to a spherical article, such as granules, carbonizing at 400° to 700° C and activating these materials by contacting with steam at 600° to 1000° C or it has been produced by carbonizing and activating crushed coconut shells in the same manner as described above.

The granular activated carbon is used for absorbing impurities in waste water or gases, and regenerated by heating and used repeatedly.

For this purpose, the granular activated carbon is required to have adsorptive activity and mechanical strength such as compression resistance and abrasion resistance. That is, it is an essential factor for granular activated carbon of high quality to have high degrees of mechanical strength and adsorptive activity even after repeated regeneration operations at a high temperature.

In view of mass production of the granular activated carbon, it also necessary to establish an efficient method for shaping, carbonizing and activating these raw materials with a high speed and on a large scale.

However, according to conventional processes for producing granular activated carbon, the step of aging treatment, i.e., the step of vaporization of the volatile components slowly by heating at low temperature for several hours or several days, is time-consuming and hinders effective mass production.

On the other hand, the quantity waste tires has been increasing year after year and they have been recently used for an artificial reef, reclaimed rubber, and reclaimed powder rubber. However, less than half of the waste tires have been consumed for the above mentioned uses. New uses for the waste tires are demanded to solve various troubles caused by the increase of waste tires.

Pyrolysis of waste tires has been recently proposed which produces volatile portions such as gases, light oils and heavy oils used as fuels and further pyrolysis residue is used as raw materials for activated carbon.

When granular activated carbon is produced from the waste tire pyrolysis residue alone, the product has neither excellent mechanical strength nor physical and chemical properties. Unless enough time is taken for an aging treatment, it is very difficult to granulate and form activated carbon having high mechanical strength.

The inventors tried to develop an efficient process for producing granular activated carbon of high quality from the waste tire pyrolysis residue by examining various kinds of additives, binders and the composition ratios and applying various kinds of shaping methods, and succeeded in attaining a novel and efficient method by using a restricted composition by means of a screw extruder under some restricted conditions.

The screw extruder has never been used for producing granular activated carbon because of the difficulty of high speed extrusion owing to high viscosity of the composition of the carbonaceous materials.

Even when the die or the region near the die of the extruder is kept at such high temperatures as those used in the shaping process of conventional plastics, it is not possible to extrude said composition because gas evolution, the intermittent projection of the contents from the die and the breakage of the screw often occur.

These phenomena result from the heterogeneous softening behavior of the composition comprising the carbonaceous material of high melting point and the binder of low melting point.

SUMMARY OF THE INVENTION

According to the present invention, there is provided a process for producing granular activated carbon from a waste tire pyrolysis residue which comprises kneading homogeneously under heating condition a mixture of (A) $(a-1)$ the waste tire pyrolysis residue and $(a-2)$ a wooden carbonaceous material with (B) a carbonaceous binder, wherein $(a-1)/(a-2)$ (weight ratio) ranges from 100/30 and (A)/(B) (weight ratio) ranges from 50/50 to 65/35, extruding the composition thus kneaded by means of a screw extruder the temperature of which is controlled in the range of from 60° to 200° C at the position of the inner surface of the cylinder case near the inlet thereof and in the range of from 140° C to 250° C at the die or the region near the die thereof, cutting the extruded composition to the desired lengths, and carbonizing the composition thus cut followed by activation.

According to another aspect of the present invention, there is provided a process for producing granular activated carbon as set forth above, wherein $(a-3)$ a saccharide is added to the (A) component of the mixture and $[(a-1)+(a-2)]/(a-3)$ (weight ratio) is in the range of from 100/1 to 100/15.

It is an object of the present invention to provide an economical process for producing granular activated carbon having both excellent mechanical and adsorptive properties.

It is another object of the present invention to provide an efficient process for producing granular activated carbon of high quality.

It is a further object of the present invention to provide a utilization of the waste tire to granular activated carbon.

DESCRIPTION OF THE PREFERRED EMBODIMENTS

Figure 1:
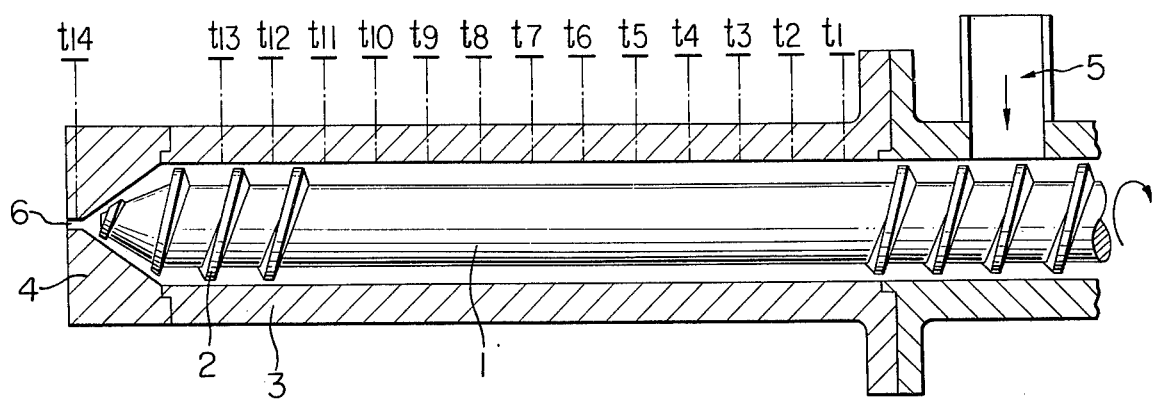
FIG. 1 shows diagrammatically a longitudinal sectional view showing the screw extruder used in Example 1.

The waste tire pyrolysis residue to be used as (A) $(a-1)$ component in the present invention may be produced by pyrolyzing waste tire chips in an inert atmosphere, evaporating volatile oil or gas off and crushing the resulting residue amounting to 30 – 40% of raw waste tire pyrolysis product.

As method for producing said waste tire pyrolysis residue, reference is made to some reports, for example, D. E. Wolfson et al. "Destructive distillation of scrap tires" (Report of investigation 7302, U.S. Department of Interior; Bureau of Mine).

The pyrolysis product may be also obtained by any other pyrolytic method. The content of oil remaining in the pyrolysis residue affects the yield and the hardness of the resulting granular activated carbon. Lower oil content in the pyrolysis residue favors better results.

The wooden carbonaceous material to be used as (A)(a—2) component in the present invention may be a carbonized material of cellulosic materials such as wood (lumber, chip, saw dust), straw, rice hull, paper mill waste, and waste pulp.

Among them, the wood char produced by carbonizing saw dust is preferable.

The saccharide to be used as (A)(a—3) component in the present invention may be at least one selected from the class consisting of oligosaccharides, polysaccharides and monosaccharides.

Representative saccharides are cane sugar, beet sugar, sucrose, starch, grape sugar (glucose), fruit sugar (fructose) and their derivatives.

The carbonaceous binder to be used as (B) component in the present invention may be pitches or tars such as coal tar pitch (soft pitch medium pitch, hard pitch), wood tar, rosin pitch and their derivatives.

The composition obtained by kneading the mixture of the waste tire pyrolysis residue, wooden carbonaceous materials and carbonaceous binder is so hard at a temperature of lower than 140° C that the extrusion is very difficult and suddenly causes the gas evolution at a temperature of higher than 250° C.

At a temperature ranging from 140° to 250° C, the static friction coefficient of the composition is so low that the extrusion is easy. The minimum static friction coefficient is often found in this range. For example, the static friction coefficient of the compounding composition composed of 55 parts of the waste tire pyrolysis residue and 45 parts of coal tar pitch as to an iron surface treated with grinding decreases inversely with a rise in the surface temperature till 200° C and increases abruptly at more than 200° C, that is, it is 0.27 at 200° C and increases to 0.45 at 250° C.

The amount of said binder (B) is in the range of from 35 to 50 weight percent to said compounding composition consisting of (A) and (B).

When the amount of binder is less than 35 weight percent, the compounding procedure becomes extremely difficult and when more than 50 weight percent, the efficiency for production is remarkably decreased because it takes a long time for the aging process.

In the shaping process by means of the screw extruder, when the temperature of the inner surface of cylinder case near the hopper, e.g., $t_1$ in FIG. 1, is lower than 60° C, the screw rotation becomes remarkably difficult and when the temperature of the position near the die, e.g., $t_{14}$ in FIG. 1, is higher than 250° C, the gas evolution from the composition is remarkably increased and the contents are intermittently projected out from the die so that a continuously extruded article cannot be obtained.

When the die temperature, e.g., $t_{14}$ in FIG. 1, is lower than 140° C, the extrusion resistance is remarkably increased and either the shaping process is not possible or the mechanical strength of the shaped article is appreciably low.

Of the temperature gradient from $t_1$ to $t_{14}$ in FIG. 1, it is preferable that it change linearly, however, any temperature gradient between $t_1$ and $t_{14}$ may also be applicable.

The preferable temperature ranges of $t_{14}$ and $t_1$ is from 160° to 230° C and from 140° to 170° C, respectively.

The granular activated carbon may be obtained with high efficiency under the conditions described as above by use of the composition obtained by compounding and kneading only the waste tire pyrolysis residue and the binder.

However, the product has unsatisfactory adsorptive and mechanical properties. The inventors found it possible to produce granular activated carbon having excellent adsorptive and mechanical properties with highly efficient compounding and shaping properties by compounding a given amount of wooden carbonaceous materials with said composition.

In addition, when the saccharide is added to said composition, the activating time is remarkably shortened and the resulting granular activated carbon has further improved mechanical properties.

The amount of wooden carbonaceous materials to be used in the present invention is within the range of from 30 to 300 parts to 100 parts of the waste tire pyrolysis residue.

When amounts less than 30 parts are used, the compounding effect is low, and when the amount more than 300 parts are used, the mechanical properties of the product decrease.

The amount of the saccharide in the present invention is within the range of from 1 to 15 parts to 100 parts of the mixture of the waste tire pyrolysis residue. When an amount less than 1 part is used, the effect in improving mechanical strength is negligible, and when an amount more than 15 parts is used, the mechanical strength of the activated carbon is not improved in proportion to the increase of the amount and accordingly this case is economically disadvantageous. Any additional order of a saccharide to said composition may be applicable.

The compositions in which the compounding ratio of the carbonaceous binder to the mixture of the waste tire pyrolysis residue and wooden carbonaceous materials is within the range of from 50/50 to 65/35 can be easily extruded and cut to the desired length.

After the cutting operation, the resulting shaped granules are carbonized in a furnace by elevating the temperature from room temperature to 400° or 700° C gradually for 3 – 5 hours under an inert atmosphere, and then activating by contacting with steam at a temperature of from 600° to 1000° C for 5 – 7 hours.

The carbonization and activation to form the granular activated carbon are ordinarily conducted as described above, however, any other methods may also be applicable.

The size of the granular activated carbon of the present invention can be controlled at a desired diameter or length, for example, a diameter of 4 – 6mm is preferable for high productivity, or large scale production.

The granular activated carbon thus obtained according to the present invention may be used in place of or simultaneously with commercially available granular activated carbon as an absorbent for which the demand is recently increasing.

The following examples are given for the purpose of illustration and not by way of limitation.

The parts, ratios and percents are by weight unless otherwise indicated.

EXAMPLES 1-5 AND COMPARATIVE EXAMPLES 1-6

The raw materials for the granular activated carbon of the present invention were extruded cylindrically by the screw extruder shown in FIG. 1. The diameter is 6cm, screw flight pitch is 2.5cm, screw inner diameter is 4cm, diameter of die outlet is 0.5cm, and overall length is 48cm.

In FIG. 1, the height of flight 2 attached on screw axis 1 decreases linearly from hopper 5 to die 4 to decrease the transfer volume in this order.

Thermocouples were set in the holes bored on cylinder case 3 at the positions from $t_1$ to $t_{14}$ respectively which are shown in FIG. 1, in order to measure the inner temperature.

The inner temperature of cylinder case 3 was controlled by a band heater which was molded with metal plate containing nichrome wire heater and by an air or water cooler.

The composition of the raw materials for the granular activated carbon of the present Examples was compounded as follows.

| | |
|---|---|
| Component (A) | |
| (a - 1) the waste tire pyrolysis residue | 100 parts |
| (a - 2) wood char | 30 parts |
| Component (B) coal tar pitch | 86.6 parts |

The wood char herein used is obtained by carbonizing saw dust (hereinafter denominated as "wood char" unless otherwise indicated).

The composition was extruded at each of the given temperatures to measure the extruding rate therein. The results are shown in Table 1.

As shown in Table 1, it is concluded that the extrusion is impossible under the conditions of Comparative Examples 1 and 6, and that a homogeneous extruded material is not obtained on account of gas evolution under the conditions of Comparative Example 4. From the results shown in Table 1, it is clearly necessary to maintain the temperature of $t_1$ in the range of from 60° to 200° C and the temperature of $t_{14}$ in the range of from 140 to 250° C.

Table 1

| Example or Comparative Example Nos. | Temperature of the extruder | | extrusion rate (Kg/hr.) |
|---|---|---|---|
| | the inlet position $t_1$ (° C) | the outlet position $t_{14}$ (° C) | |
| Example 1 | 60 | 240 | 15.8 |
| Example 2 | 93 | 200 | 16.4 |
| Example 3 | 112 | 248 | 14.0 |
| Example 4 | 116 | 192 | 14.2 |
| Example 5 | 152 | 204 | 14.5 |
| Comparative Example 1 | 34 | 284 | impossible to extrude |
| Example 2 | 214 | 224 | 7.4 |
| Example 3 | 240 | 234 | 8.9 |
| Example 4 | 254 | 300 | incompletion in shaping |
| Example 5 | 100 | 280 | '' |
| Example 6 | 100 | 130 | impossible to extrude |

The extrusion rate is the quantity extruded per unit of time.

EXAMPLES 6 - 8

The compositions shown in Table 2, were extruded in the same procedure as described in Example 1 to measure an extruding rate in each composition.

The inlet temperature $t_1$ and the outlet temperature $t_{14}$ were set at 95° C and 215° C, respectively.

The results obtained are shown in Table 2.

Table 2

| Example No. | The waste tire pyrolysis residue(part) | Wood char (part) | Cane sugar (part) | Coal pitch (part) | extrusion rate (Kg/hr.) |
|---|---|---|---|---|---|
| 6 | 100 | 100 | 0 | 200 | 18.5 |
| 7 | 100 | 300 | 0 | 270 | 15.2 |
| 8 | 100 | 100 | 24 | 130 | 12.1 |

EXAMPLES 9 - 10

The waste tires were pyrolyzed in a cylindrical pyrolysis tower. The volatile components such as oil and gas were taken off from the top of the tower and the residue was taken out from the bottom of the tower.

By repeating such procedure twice, two kinds of pyrolysis residues containing different amounts of oil were obtained.

By using these two kinds of powdered pyrolysis residues, two kinds of the granular activated carbons were manufactured in the same procedure as described in Example 1.

That is, the mixture (A) of 100 parts of the waste tire pyrolysis residue and 100 parts of wood char was compounded and kneaded with binder (B) (coal tar pitch) at the weight ratio of A/B of 65/35 and extruded cylindrically by means of a screw extruder (diameter of 5mm) under the conditions shown in Example 6, and cut to a length of 5 - 10mm, carbonized at 600° C for 5 hrs. in an inert atmosphere, and thereafter activated at 850° C for 5 hrs. with steam. The yield and hardness of activated carbons obtained are shown in Table 3.

Table 3

| Example No. | The oil content remaining in the pyrolysis residue (%) | Granular activated carbon | |
|---|---|---|---|
| | | *yield (wt.%) | hardness (%) |
| 9 | 5.5 | 38.8 | 92.7 |
| 10 | 2.2 | 45.0 | 95.5 |

*"yield" is the rate of changing a shaping article to a granular activated carbon, i.e.,
$$\frac{\text{Weight of the resulting granular activated carbon}}{\text{Weight of the extruded composition}} \times 100\%$$

From these results, it is concluded that the less the content of oil remaining in the waste tire pyrolysis residue, the better the yield and hardness of the granular activated carbon.

The iodine adsorption values of any activated carbon obtained in these Examples were more than 800 mg/g.

EXAMPLES 11 - 15 AND COMPARATIVE EXAMPLES 7 - 9

The compositions were prepared by compounding and kneading the waste tire pyrolysis residue (oil content; 2.5 weight %) wood char power (passing through 74 μ screen) and coal tar pitch as carbonaceous binder under heating conditions shown in Table 4.

The compositions obtained were extruded cylindrically in the same procedure as described in Example 6 by means of a screw extruder. Thereafter, the shaped articles obtained having a diameter of 5 mm and length of 5 – 10 mm were carbonized in the furnace by raising the temperature gradually from room temperature to 600° C for 5 hrs. in an inert atmosphere, and then activated at 850° C for 6.5 hrs. by contacting with steam to form granular activated carbon.

The mechanical strength, adsorptive activity and other properties of the product are shown in Table 4.

Characteristic values of the products were measured as follows.

a. Hardness

The activated carbons were crushed to small particles (diameter; 710 – 1410 $\mu$) and put into a steel pot having 15 steel balls of 10 mm diameter and 15 steel balls of 8 mm diameter therein.

The measurement of hardness was conducted according to JIS-K-1412.

b. Strength at break (Compression resistance)

The test sample was crushed and sieved by means of a 1.68 mm sieve. Each particle caught by the sieve was taken out and was pressed and crushed with a bar having a flat end on a platform scale of 4 kg. The load at crushing of said particle was measured by said platform scale. The load at crushing represents the strength at break.

c. Surface area

Specific surface area was measured according to the simple BET method (one point measurement) by means of Auto specific surface area measurement apparatus made by Shimazu Seisakusho Ltd.

d. ABS value (measured according to the powdered activated carbon test method which was established by Nihon Suido Association)

Into each of 50 ml of ABS (sodium salt of dodecyl benzene sulfonate) standard aqueous solution, 0 – 10 ml of the aqueous suspension of the narrow sieve fraction of activated carbon which was sieved by a 100 mesh sieve at a concentration of 1.0 mg/ml was added thereto and shaken.

Thereafter, the amount of adsorbed or unadsorbed ABS was determined. The ABS value is the amount of activated carbon (as ppm) necessary for absorbing ABS from a 5.0 ppm ABS solution and reducing the ABS to 0.5 ppm.

e. Iodine adsorption amount

Iodine adsorption amount (mg) per 1.0 g of activated carbon.

The iodine adsorption amount was determined by adding 50 ml of 0.1 N iodine aqueous solution to 0.5 g of the activated carbon which was the narrow sieve fraction passing through a 100 mesh sieve, shaking the mixture for 30 minutes, measuring the amount of remaining iodine with 0.1 N sodium thiosulfate and then calculating from said amount of thiosulfate the quantity of the remaining iodine.

f. Caramel decoloring capacity

The caramel decoloring capacity was determined by adding 40 cc of the caramel decoloring test solution to 0.1 g of an activated carbon passing through a 100 mesh sieve, shaking said mixture for 30 minutes and thereafter measuring by means of a De'vosc colorimeter.

Said caramel decoloring test solution was prepared by dissolving 60 g of granulated sugar in 40 ml of distilled water, adding diluted sulfuric acid which is prepared by mixing 5 ml of conc. sulfuric acid and 20 ml of distilled water to the above solution, heating, adding 10 g of sodium hydroxide, and diluting this solution with the buffer solution containing alkali phosphate so that this solution showed 40 % specific color concentration by means of a De'vosc colorimeter in comparison with the color of 0.1 g iodine solution.

Table 4

| Example or Comparative | Composition ratio | | | | Properties of granular activated carbon | | | | | |
|---|---|---|---|---|---|---|---|---|---|---|
| | Waste tire pyrolysis residue | Wood char | Coal tar pitch | Tar | Mechanical strength | | Specific [1] surface area | Iodine Adsorption amount | ABC value | Caramel decoloring capacity |
| | | | | | Hardness | Strength at break | | | | |
| Example Nos. | weight part (weight %) | " (") | " (") | " (") | % | kg | m²/g | mg/g | [–] | % |
| Comparative Example 7 | 100 (65) | 0 (0) | 38 (25) | 15 (10) | impossible to extrude | | | | | |
| Example 11 | 100 (49) | 33 (16) | 51 (25) | 20 (10) | 93 | 0.8 | 530 | 750 | 86 | 73 |
| Example 12 | 100 (32.5) | 100 (32.5) | 77 (25) | 31 (10) | 96.8 | 1.7 | 650 | 870 | 84 | 78 |
| Example 13 | 100 (16) | 300 (49) | 154 (25) | 62 (10) | 98.2 | 1.8 | 760 | 950 | 76 | 80 |
| Comparative Example 8 | 0 (0) | 100 (65) | 38 (25) | 15 (10) | 71.6 | 0.7 | 820 | 1070 | — | — |
| Example 14 | 100 (32.5) | 100 (32.5) | 92 (30) | 15 (5) | 95.3 | 1.6 | 650 | 870 | 84 | 76 |
| Example 15 | 100 (32.5) | 100 (32.5) | 107 (35) | 0 (0) | 95.4 | 1.65 | 650 | 840 | 89 | 75 |
| Comparative Example 9 | 100 (61) | 0 (0) | 65 (39) | 0 (0) | 76.1 | 0.5 | 460 | 680 | — | — |

[1]These values are systematically lower by 70–100 m²/g than those obtained by the BET method.

The following are concluded from the results shown in Table 4. When the compounding amount of the wooden carbonaceous material is appreciably little or none, 40 % or more of the binder (B) to the component (A) is required for the shaping process (Comparative Example 7) and the resulting granular activated carbon is inferior not only in mechanical strength (both abrasion resistance and compression resistance) but also in adsorptive activity owing to its small surface area (Comparative Example 9). On the contrary, when restricted amounts of the wooden carbonaceous material are compounded, the granular activated carbon having both excellent mechanical strength and adsorptive activity is obtained (Examples 11 – 15).

However, when an excess of the wooden carbonaceous material is used without using the waste tire pyrolysis residue, the suitable activated carbon is not obtained because its mechanical strength, especially abrasion resistance decrease though its surface area and adsorptive activity increased (Comparative Example 8). The compounding ratio of coal tar pitch and tar as a binder does not give any change to the properties of the activated carbon though they are useful for controlling the viscosity of the compound in the shaping process.

EXAMPLES 16 – 24

Cane sugar as saccharide was compounded with mixture (A) consisting of 100 parts of wood char and 100 parts of the same waste tire pyrolysis residue as used in Examples 11 – 15, at the weight ratio of (A)/cane sugar of 100/15.

The carbonaceous binder (coal tar pitch) (B) was added to said mixture at the ratio of (A)/(B) of 65/35.

After compounding and kneading, the composition was extruded under the same conditions as that in Example 6.

After carbonization, the products were activated under the same conditions as that in Examples 11 – 15 except that the activating time was 3.5, 4.5 and 5.5 hrs, respectively.

The results are shown in Table 5.

In Examples 19 – 24, various amounts of cane sugar were added to the composition as described in Table 6, the composition obtained was carbonized in the same procedure as that in Examples 11 – 15 and activated for 5 hrs.

The properties of these granular activated carbons are shown in Table 6.

Table 5

| Example Nos. | Activating time (hr.) | Hardness (%) | Strength at break (kg) | Iodine Adsorption amount (mg/g) |
|---|---|---|---|---|
| 16 | 3.5 | 99.5 | 2.0 | 800 |
| 17 | 4.5 | 99.2 | 1.7 | 860 |
| 18 | 5.5 | 98.8 | 1.4 | 905 |

Table 6

| Example Nos. | Carbonaceous raw materials the waste tire pyrolysis residue (part) | Carbonaceous raw materials wood char (part) | cane/sugar (weight ratio) | Hardness (%) | Iodine Adsorption Amount (mg/g) |
|---|---|---|---|---|---|
| 19 | 100 | 100 | 100/5 | 98.3 | 892 |
| 20 | 100 | 50 | 100/5 | 96.0 | 840 |
| 21 | 100 | 200 | 100/5 | 94.1 | 910 |
| 22 | 100 | 100 | 100/11 | 97.9 | 884 |
| 23 | 100 | 50 | 100/11 | 96.4 | 824 |
| 24 | 100 | 200 | 100/11 | 96.6 | 900 |

Tables 5 and 6 show that the activation time is shortened and the granular activated carbon having improved adsorptive property and mechanical strength is obtained by adding cane sugar.

We claim:

1. A process for producing granular activated carbon from scrap tire pyrolysis residue which comprises homogeneously kneading at an elevated temperature a mixture of (A) (1) the scrap tire pyrolysis residue and (A) (2) a wooden carbonaceous material with (B) a carbonaceous binder, the ratio (A) (1) / (A) (2) being from 100/30 to 100/300 and the ratio of (A) / (B) being from 50/50 to 65/35, extruding the kneaded mixture from a cylindrical screw extruder having a temperature in the range from 60° to 200° C at the inlet cylinder surface and a temperature in the range of from 140° to 250° C at the outlet, cutting the extruded composition to a selected length, and carbonizing and then activating the cut extrusion product.

2. A process for producing granular activated carbon according to claim 1, wherein (A) (3) a saccharide is added to the (A) component of the mixture and the ratio of (A) (3) is in the range of from 100/1 to 100/15.

3. A process for producing granular activated carbon according to claim 1, wherein the wooden carbonaceous materials to be used as the (A) (2) component are selected from the class consisting of the carbonized materials of wood, straw, rice hull, paper mill waste and waste pulp.

4. A process for producing granular activated carbon according to claim 1, wherein the carbonaceous binder to be used as (B) component is selected from the class consisting of coal tar, coal tar pitch, wood tar pitch, and rosin pitch.

5. A process for producing granular activated carbon according to claim 2, the saccharide to be used as (A) (3) component is selected from the class consisting of oligosaccharide, polysaccharide and monosaccharide.

6. A process for producing granular activated carbon according to claim 5, wherein the saccharide is selected from the class consisting of cane sugar, beet sugar, sucrose, starch, grape sugar (glucose) and fruit sugar (fructose).

7. A process for producing granular activated carbon according to claim 1, wherein the temperature at the inner surface of the cylinder case near the hopper is within the range of from 140° to 170° C.

8. A process for producing granular activated carbon according to claim 1, wherein the temperature at the die or the position near the die is within the range of from 160° to 230° C.

* * * * *

UNITED STATES PATENT OFFICE
CERTIFICATE OF CORRECTION

PATENT NO. : 4,002,587
DATED : January 11, 1977
INVENTOR(S) : Yasuo Watanabe et al.

It is certified that error appears in the above-identified patent and that said Letters Patent are hereby corrected as shown below:

Column 3, line 21, after "pitch" (second occurrence) insert a comma.

Column 10, line 18, after "ratio of" insert --[(A)(1)+(A)(2)]/--.

Signed and Sealed this

Twenty-first Day of June 1977

[SEAL]

Attest:

RUTH C. MASON
Attesting Officer

C. MARSHALL DANN
Commissioner of Patents and Trademarks